March 2, 1943.  J. T. ENLEY  2,312,396
WHEEL FOR ROLLER SKATES
Filed Dec. 21, 1940
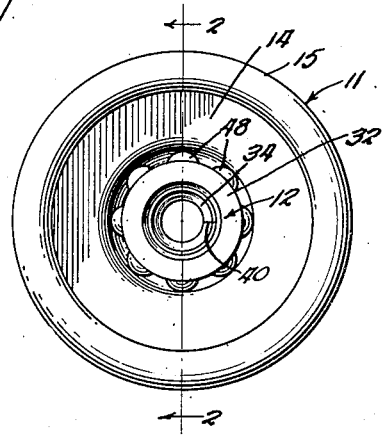
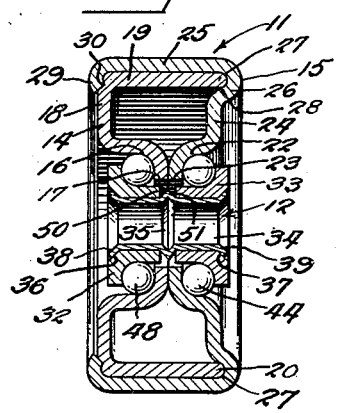
Inventor
J. T. Enley
By Mason Fenwick & Lawrence
Attorneys Patented Mar. 2, 1943

2,312,396

UNITED STATES PATENT OFFICE 2,312,396

WHEEL FOR ROLLER SKATES

John Thomas Enley, Riverside, N. J.

Application December 21, 1940, Serial No. 371,179

1 Claim. (Cl. 301—5.7)

This invention pertains to roller skates and the like, and is more particularly directed to a wheel construction suitable for roller skate wheels.

The invention comprises a novel wheel body structure, and a novel bearing structure, and includes a novel combination of the wheel body and bearing construction. The novel structures of the wheel body and the bearing presents a sturdy wheel of low cost, the construction of the respective elements of which facilitate assembly of its members.

With reference to the wheel body, the invention comprises a pair of opposed discs formed companion to each other, each disc comprising a bearing raceway describing a central axial aperture. Each disc thus provides a raceway suitable, for example, for a set of bearing balls, the raceway being integral with the portions of the discs which comprise the side walls and the rim of the wheel.

The rims of the respective discs are interlocked to provide a double thickness of material in the wheel rim and the rims of the respective discs are formed to engage each other for their mutual support to comprise the composite wheel body. Thus, the two discs are joined together as a composite structure comprising the wheel body, and this is accomplished without the use of other elements to attach the discs together.

The wheels are constructed of sheet material, for example, sheet metal, formed by conventional punch press operations which operations, according to well known prior art practice, do not position all elements accurately with reference to each other within allowable mechanical limits. Accordingly, under the prior art practice, members constructed of sheet material are required to be subjected to machining operations for the precise relative placement of certain elements which require precision positioning. Such machining operations are usually relatively costly, and the practice of the present invention eliminates a number of costly processing operations.

Thus normally in the construction of wheels which rotate, for example, on ball or roller bearings, it is necessary to machine the bearing raceways to position them precisely relative to each other. The hard surface of a raceway produced by the punch press operation is, therefore, removed, and it then usually becomes necessary to subject the raceways to a heat-treating, casehardening operation, to render them wear resistant. This in turn requires an additional grinding operation to overcome warping of the raceway surfaces which results from the heat treating operation and to make the surfaces smooth.

Under the practice of the present invention the wheel structure is assembled in such a manner that the raceways produced in the wheel body, with hardened surfaces caused by the punch press operation, are precisely positioned relative to their respective companion raceways of the bearing member to eliminate the various machining and heat treating operations such as were required under the prior art to precisely position the raceways.

Pursuant to this purpose, a retaining unit is provided comprising a tubular retainer adapted to pass through the central axial apertures in the disks carrying at its opposite ends the bearing cones which hold the balls in place and which constitute the outer members of the bearing raceways, said cones being retained upon said tubular retainer by end flanges on the latter which clamp the cones into definite position with respect to an external intermediate annular ridge on the tubular retainer and by which retainer the cones are clamped with uniform circumferential pressure against the bearing balls on opposite sides of the skate wheel.

The retainer, in the preferred practice of the invention, comprises a tube with flanges formed by a pressing operation to hold the cones in predetermined position relative each other. The retaining member comprises a circumferential ridge intermediate of its ends and between the cones. The cones are respectively held between the circumferential ridge and flanges at respective opposite ends of the retaining member. The ridge yields in the assembly operation to permit the bearing raceway in different wheels to be positioned slightly different distances relative to each other accordingly as the raceways in the wheel body of the incident wheel are positioned relative to each other. Thus, the process of assembling the wheel comprises a material portion of the invention.

For a more thorough understanding of the nature of the invention, reference is now made to the accompanying drawing showing details thereof, in which drawing—

Figure 1 is a side elevation showing the wheel of the present invention;

Figure 2 is a cross-sectional elevation taken on line 2—2 of Figure 1; and

Figures 3, 4, 5, and 6, respectively, illustrate successive steps in the process of assembling the wheel of Figure 1.

The wheel of the present invention comprises the body member indicated generally by reference numeral 11, and the bearing member indicated generally by reference numeral 12. The body member 11 rotates on the bearing member 12, the bearing preferably being of the roller, or of the ball type, as shown. The positioning of the wheel in the skate, as well as its manner of operation, is well known, and further description of the skate construction is deemed unnecessary.

The body member 11 comprises the male and female discs 14 and 15, respectively, and in the preferred practice of the invention, as shown, the discs 14 and 15 constitute the body member in its entirety. The discs 14 and 15 comprise sheet metal or similar material pressed to form, and as shown, the discs are assembled to provide a unitary structure which rotates on the bearing member 12.

The disc 14 is formed with the concentric raceway 16 which describes the central aperture 17. Radially outwardly from the bearing raceway 16, the disc is formed to provide the sidewall 18 which, in the assembled body member, comprises a side wall of the wheel. At its outer periphery the disc 14 is formed, as by pressing, to provide the rim cylinder 19 which projects laterally away from the side wall 18 in the same direction as the ball raceway 16, providing the projecting edge 20.

The female disc 15 is provided with the concentric bearing raceway 22 which describes the central aperture 23, the aperture 23 conforming with the size and diameter of the aperture 17 of the disc 14. In the preferred practice of the invention, as shown, the bearing raceway 22 is of the same dimensions as the raceway 16 of the disc 14, the raceways 16 and 22 being directed away from each other towards the outside of the wheel body. Radially outwardly from the ball raceway 22, the disc 15 is formed to provide the side wall 24 which, in the assembled body member, comprises the side wall of the wheel opposed to the side wall 18. Beyond the side wall 24, the disc 15 is formed to provide the rim cylinder 25.

The inside of the cylinder 25 and the outside of the cylinder 19 of the female and male discs 15 and 14, respectively, are constructed of like diameters for the cylinder 19 to fit into the cylinder 25, as illustrated in Figure 2. Between the cylinder 25 and the side wall 24, the disc 15 is provided with the ridge 26 formed as by pressing, which ridge 26 presents a rim flange of pleasing appearance. The ridge 26 performs the utilitarian function of providing a concentric groove 27 in which the projected edge 20 of the cylinder 19 seats. In accordance with the construction the groove 27 provides the ledge 28 on which the edge 20 of the rim member 19 bears, and is thus supported against collapsing.

The projected end of the cylinder 25 is made of added length to extend beyond the side wall 18 of the disc 14 when the rim cylinder 19 is inserted in rim cylinder 25. This added length is pressed around the cylinder 19, as illustrated at 29 in Figure 2, and is pressed into firm engagement with the metal of disc 14 to attach the discs 14 and 15 to each other.

Thus, the assembly operation of the body member 11 comprises the steps of positioning the rim cylinder 19 of the male disc 14 inside the rim cylinder 25 of the female disc 15, pressing the discs together to seat the edge 20 of the cylinder 19 in the groove 27 and in firm engagement with the ridge 28, and pressing the edge 29 of the cylinder 25 around and in back of the cylinder 19 in holding engagement with the disc 14. The corner 30 of the turned edge 29 embeds itself in the metal of the male disc 14, as illustrated in Figure 2. This construction provides a sturdy wheel body with a two-thickness rim material, in which the inner rim cylinder 19 continues to be supported by the side walls 18 and 24 of the discs 14 and 15, respectively, even after the outer rim cylinder 25 is entirely worn away.

The retaining unit comprises the bell-shaped cones 32 and 33, which may be of like construction, and which in any event are constructed companion to the respective raceways 16 and 22 of the respective discs 14 and 15.

The tubular retainer 34 comprises a cylinder which fits inside the cones 32 and 33, as shown, and operates to hold the cones spaced apart a predetermined distance with reference to each other and with reference to their respective companion raceways 16 and 22. The retainer 34 is provided with a concentric ridge 35 which functions as a spacer between the cones 32 and 33 to hold them in proper relative position. The ridge 35 is made to yield and collapse under lengthwise compression of the retainer 34, to afford allowance for variation of the relative spacing of the cones 32 and 33 in accordance with the distance between raceways 16 and 22 of the discs.

The cones 32 and 33 are chamfered respectively at 36 and 37, the respective chamfers 36 and 37 receiving the flanges 38 and 39 at the opposite ends of the retainer 34. The cone 32 is held precisely positioned between the flange 38 and the concentric ridge 35 and the cone 33 is held precisely positioned between the concentric ridge 35 and the flange 39.

The described construction, as illustrated in Figure 2, eliminates several costly production operations which are normally incident to the production of members comprising bearing raceways. According to prior art practice, raceways, such as 16 and 22, are usually machined to accurately position them in the member. The raceways are usually heat-treated to case harden them and they are thereafter ground to provide a smooth surface and to remove any unevenness caused by warping in the heat treating operation. Frequently there is a preliminary annealing operation necessary to give the material the required toughness away from the raceway element. In the construction of the roller of the present invention, all these operations are eliminated because the hardened surfaces caused by cold working the metal incident to the pressing operation are employed as bearing raceways. The wheel of the present invention is a punch press product, and the novel assembly operation, illustrated in Figures 3, 4, 5, and 6, enables the use of the cold work hardened surfaces for bearing raceways.

As a first step in the assembly process, the retainer 34 is projected into the cone 33 until it abuts against the ridge 35. The retainer 34 is constructed of flat sheet material with the ridge 35 pressed into it. The sheet is thereafter formed cylindrical with edges meeting along the line 40, the meeting of the edges in the embodiment shown describing an element of the cylinder.

The cylinder of retainer 34 fits the inside of the cone 33 and, being of resilient material, is in spring pressed engagement therewith.

The retainer 34, with the cone 33 attached to it, is placed on the bottom die 42 in the position illustrated in Figure 3. The die 42 projects upwardly from the platen 43, as shown, high enough to provide clearance for purposes to be described.

With the central holding cylinder 34 and the cone 33 positioned as described, and as shown in Figure 3, a set of balls 44 are placed in position on the cone. Means may be provided in the die construction to hold the balls in place to prevent their falling due to machine vibration. For example and as illustrated in Figure 3, a cup shaped element 45 may be provided which surrounds the cone 33 and the set of balls 44, holding the balls from falling away laterally from the raceway. The cup shaped member 45 is preferably mounted to move out of engagement with the balls 44 after they are held in proper position in the raceway by means of the body member 11 of the wheel. Accordingly, the cup shaped member 45 is attached to the vertical guide rods 46 and are held yieldingly in their upper position, as by means of the compression springs 47.

With the elements in the position illustrated in Figure 3, a wheel body member 11 is placed over the retainer 34, and the parts take the position illustrated in Figure 4. The weight of the wheel body member 11 resting on the cup shaped element 45 will cause it to retract against the tension of the springs 47 and, as the cup shaped member 45 retracts, the ball raceway 22 of the disc 14 engages the set of balls 44 and holds them in position in the cone 33. Now a second set of balls 48 is positioned in the raceway 16 of the disc 14, as illustrated in Figure 4.

The next step is to place the cone 32 on the retainer 34 and in abutment with the circumferential ridge 35, as illustrated in Figure 5. In this position it will be noted that the opposite ends of the retainer 34, which are not as yet upset, project into the chambers 36 and 37 of the respective cones 32 and 33. The various elements positioned as described, and as shown in Figure 5, are now ready to be compressed into holding engagement with each other to produce the wheel as a completed product in the form illustrated in Figure 2. This is performed by a simple single pressing operation.

As noted in Figure 6, the movable die 49 moves vertically downwardly into engagement with the upper end of the retainer 34 to upset the opposite ends of the cylinder, and form the flanges 38 and 39 to engage the chamfers 36 and 37, respectively. The movable die 49 continues to move toward the bottom die 42 to press the cones 32 and 33 toward each other until the sets of balls 44 and 48 are in bearing engagement with their raceways. The respective cones 33 and 32 are thus placed in bearing engagement with their respective companion raceways 22 and 16, of the respective discs 15 and 14. In order that the cones 32 and 33 may thus be moved toward each other in proper bearing engagement with their companion raceways, the concentric ridge 35 yields and compresses, and in doing so assumes a firm holding engagement with the inside edges 50 and 51 of the respective cones 32 and 33.

As a result of this construction, the raceway surfaces of the respective ball raceways 16 and 22 comprise the surfaces hardened by the punch press operation which forms the respective discs 14 and 15 of the body member 11. Continued use of the dies which form the discs 14 and 15 causes their surfaces to wear, and thus successive body members 11 are produced with their ball raceways 16 and 22 spaced apart unequal distances. There may be a variation of several thousands of an inch between raceways 16 and 22 in different body members 11. The concentrac ridge 35 is compressible to a degree to seat the cones 32 and 33 firmly between it and the respective flanges 38 and 39, and to afford allowance to place the raceways of cones 32 and 33 in proper bearing engagement with their respective companion raceways 16 and 22 of a given body member 11.

The wheel construction shown and described may vary within wide limits and the steps described in the process of producing the wheel may also be varied without departing from the spirit of the present invention. Thus applicant is not to be limited by the specific hereinbefore disclosure, but the scope of his invention is to be determined by the accompanying claim.

What I claim is:

Roller skate wheel comprising a body member of sheet stock having concave raceways in opposite sides and an axial aperture therethrough, an annular series of bearing balls for each raceway and resting thereagainst, and a bearing retaining unit comprising a tubular retainer passing through said aperture having an intermediate external annular deformable ridge, cones non-adjustably telescoped upon said retainer with their large ends overlying said series of balls and their small ends against said ridge, said retainer having end flanges clamping said cones against said ridge, and clamping said retainer unit against both said series of balls with circumferentially uniform pressure.

JOHN THOMAS ENLEY.